Figure 1:
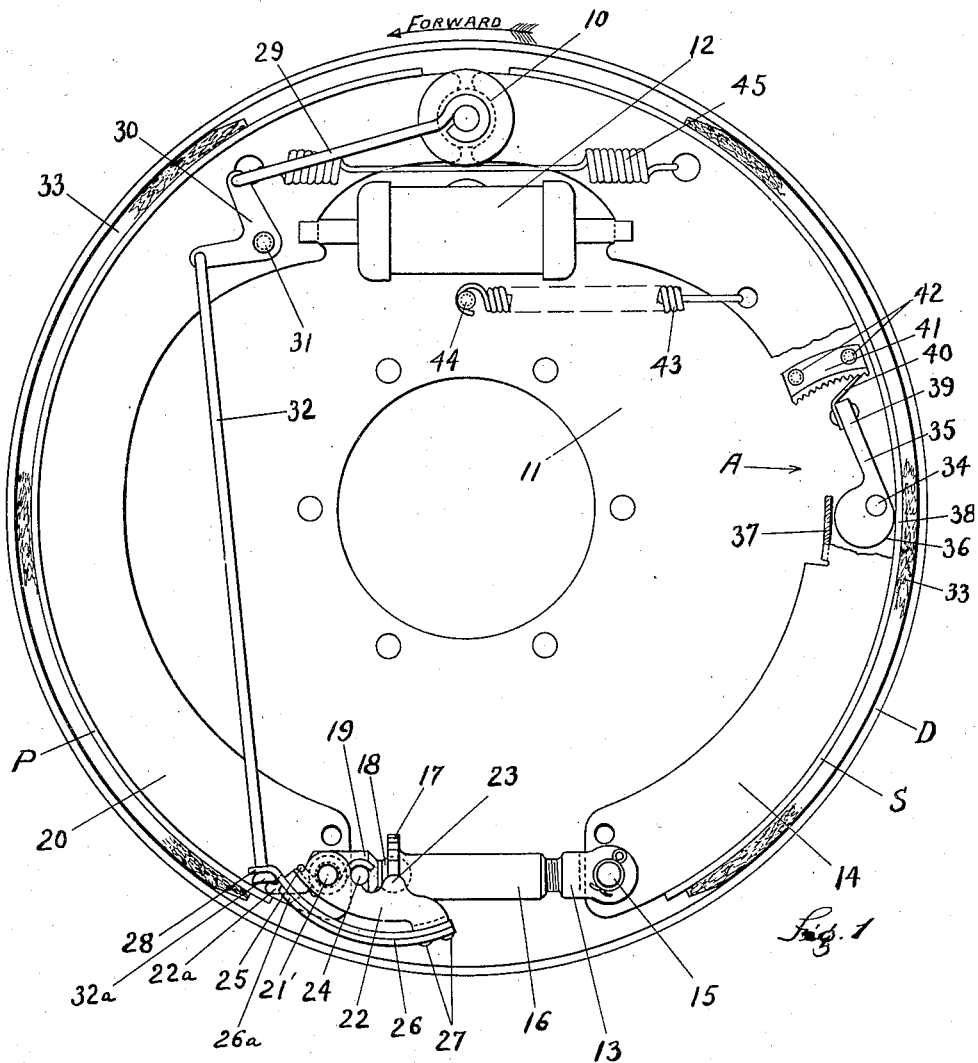

Nov. 10, 1936.　　　　G. L. SMITH　　　　2,060,429

BRAKE MECHANISM

Filed April 7, 1936

INVENTOR.
GEORGE L. SMITH.

ATTORNEY.

Patented Nov. 10, 1936

2,060,429

UNITED STATES PATENT OFFICE 2,060,429

BRAKE MECHANISM

George L. Smith, Washington, D. C., assignor to Thermo Brakes Corporation, Washington, D. C., a corporation of Virginia Application April 7, 1936, Serial No. 73,148

8 Claims. (Cl. 188—79.5)

My invention relates to automatic adjusting mechanism for brakes on motor vehicles and is especially adaptable to hydraulically operated brakes in which any slight variations in the running clearance of the several brakes is compensated for by the flow of liquid from one operating cylinder to another as necessary to produce equal brake applying pressure on all brakes.

It is illustrated for use on a well known duo-servo type of hydraulic brake in which the adjusting mechanism constitutes a floating connection between the primary and secondary shoes, and includes a thermo sensitive ratchet lever similar to that shown in my Patent No. 2,019,101 of October 29, 1935 for Automatic brake mechanism for vehicles.

The object of my invention is to maintain the running clearance of the brake practically constant regardless of wear of the brake lining and also to keep this clearance about constant around the entire circumference of the brake so that there will be no dragging of the brakes at any time.

Figure 2:
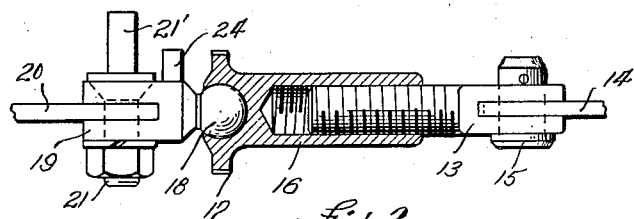

In the drawing chosen to illustrate my invention the scope whereof is set forth in the appended claims:

Figure 1 is a side elevation partly broken away of a brake mechanism embodying my invention; and Figure 2, a view partly in section of the adjusting link connecting the two shoes of the brake.

Referring to the drawing the complete brake shoe is composed of the primary shoe P and the secondary shoe S, both of which anchor on the post 10 carried by a suitable backing plate 11. This plate 11 also carries an hydraulic cylinder 12 of the well known type for expanding the shoes into engagement with the drum D.

The two shoes are connected by an adjusting mechanism consisting of a screw threaded clevis bolt 13 secured to the web 14 of shoe S by the pin 15. This bolt is threaded into a sleeve 16 which is provided with a ratchet wheel 17 at its left end. The left end of this sleeve 16 has a socket with its center in line with the plane of the ratchet wheel 17, which socket receives a ball 18 on the end of a fitting 19 rigidly clamped to the web 20 of shoe P by a bolt 21. My preferred construction of this joint is to crimp the metal of the socket around ball 18 to form a permanent connection between sleeve 16 and fitting 19.

The bolt 21 has an extension 21' forming a pivot upon which the ratchet pawl 22 is mounted and this pawl has a lip 23 engaging the teeth of the ratchet wheel 17. A stud 24 mounted on the fitting 19 limits the upward movement of the pawl 22 and a torsion spring 25 mounted on the extension to the bolt 21 acts to rotate the pawl against this stud 24.

A thermo-sensitive lever arm 26 is secured to the pawl 22 by rivets 27 and is located as close to the braking surface of the drum as possible without touching it, to ensure rapid transmission of heat from the brake drum D to this lever arm when the former becomes hot. The metal of the arm next the drum is aluminum or some other metal having a high co-efficient of expansion, and that next the pawl is steel, so that a rise in temperature of this thermo-sensitive arm 26 will bend its end 28 upward.

To operate the ratchet pawl a link 29 is connected to the anchor stud 10 and to one arm of a bell crank lever 30 pivoted at 31 to the web 20 of the shoe P. The other arm of this lever is connected to the end 28 by a link 32 having a hemispherical button 32a at its lower end which bears against the under side of the hole in end 28 through which the link 32 passes.

A lip 22a is bent out from the body of ratchet pawl 22, passes through a slot 26a in the left end of the arm 26 and bears upon the under side of the button 32a. This permits the brake release spring 45 to assist the spring 25 in rotating the pawl 22 to its initial position after it has picked up a tooth on wheel 17, as follows:— When brake is released after application, the shoe P swings clockwise and again contacts the anchor post 10. During this movement a downward thrust is developed in link 32 due to the counter-clockwise pivoting of bell-crank 30 about pivot 31. Thus the button 32a presses down on lip 22a and rotates the pawl 22 counter-clockwise. In addition to permitting the above action, the lip 22a also serves as a guide for the left end of the thermo-sensitive arm 26, which, being relatively long, might otherwise be accidentally bent out of place.

The mechanism operates as follows: When the brake is applied through the instrumentality of the cylinder 12 to arrest forward movement of the vehicle, the shoe S anchors on the post 10 and the shoe P moves away from it, opening up a gap therebetween. This causes a clockwise rotation of the bell-crank 30, as the pivot 31 moves to the left with web 20, and pulls up on link 32, rotating the pawl 22 around its pivot 21. If the gap opened up between post 10 and shoe P is great enough the lip 23 will pick up a new tooth on ratchet wheel 17, and when the brake is released and again grips the anchor stud 10 through the action of the release spring 45, the spring 25, assisted by the spring 45 as previously explained, will rotate the pawl 22 back again to its initial position, thus rotating the sleeve 16 on the screw 13 to expand the shoes and take up for wear of the brake lining 33. Also the end 28 of the thermo-sensitive arm 26 will bend upward and away from the button 32a as the brake becomes hot, thus introducing lost motion which will render the link 32 less effective in its action of rotating the pawl 22, and overadjustment of the brake when hot will be avoided. It will also be noted that with link 29 connected to the center of the anchor pin 10 any pivoting of shoe P about this anchor, as the brake is expanded in its adjustment for wear, will have no effect upon the action of the connections between anchor 10 and pawl 22.

While the above mechanism will act to automatically maintain a constant running clearance at all times, it will not center the shoes to keep them from swinging about the post 10, and dragging against the brake drum D either on one side or the other. This action is prevented by the clearance adjuster A as follows:

A pivot 34 is secured to the backing plate 11 and on it is mounted a ratchet lever 35 having a circular portion 36 which is eccentric to the pivot 34. A flange 37 is turned down on web 14 forming with the cylindrical part 38 of the shoe S a channel slightly wider than the diameter of the portion 36. The arm 39 of ratchet lever 35 is fitted at its outer end with a spring pawl 40 which engages the ratchet teeth of a rack 41 secured to the backing plate 11 by rivets 42. A spring 43 connects the web 14 with a stud 44 on backing plate to keep the cylindrical part 38 of shoe bearing against portion 36 of lever 35 when brake is released.

This adjuster operates as follows: When the brake is applied the shoe S swings outward about post 10 toward the brake drum D carrying flange 37 with it. If wear of the lining 33 is sufficiently great, this outward movement will cause flange 37 to press against portion 36 and exert a rotary force on ratchet lever 35 to swing its short arm outward and its long arm 39 inward until pawl 40 picks up a new tooth on rack 41. As portion 36 is now moved farther away from the brake center, the shoe S, when brake is released, will be held closer to the brake drum and the clearance at this point will be equal to the difference between the width of channel 37, 38 and the diameter of the portion 36.

I claim:

1. In a brake mechanism, a brake anchor, a brake shoe having brake applying movement away from said anchor, brake adjusting mechanism for said brake and operating means for said mechanism inter-connecting said anchor and said shoe.

2. In an automatically adjustable brake, a brake anchor, a pair of brake shoes, a floating adjustable link connecting adjacent ends of said shoes, and an automatic adjusting mechanism for said link mounted on one of said shoes and connected to said anchor.

3. In an automatically adjustable brake, a brake anchor, a pair of brake shoes, a floating adjustable link connecting adjacent ends of said shoes, and a thermo-sensitive adjusting mechanism for said link mounted on one of said shoes and connected to said anchor.

4. In an automatically adjustable brake, a pair of brake shoes, a floating connecting link between adjacent ends of said shoes having a ratchet wheel, and a thermosensitive ratchet lever pivotally mounted on one of said shoes and engaging said ratchet wheel.

5. In a brake mechanism, a brake anchor, a pair of brake shoes having brake applying movement away from said anchor, an adjustable connecting link between said shoes having a ratchet wheel and thermo-sensitive operating means for adjusting said link, said means interconnecting said ratchet wheel with said anchor.

6. In a brake mechanism, an anchor, brake shoes movable with respect to said anchor and having an adjustable connection, and operating means secured to said anchor and engaging said connection to adjust it.

7. In a brake mechanism, an anchor, primary and secondary brake shoes engaging said anchor and having brake applying movement with respect thereto, an adjustable connection between adjacent ends of said shoes, and operating means for said connection mounted on the primary shoe and connected to said anchor.

8. In an automatically adjustable brake, a brake anchor, a pair of brake shoes, a floating adjustable link connecting adjacent ends of said shoes, and an adjusting mechanism engaging said link mounted on supports carried by and adjacent the ends of one shoe and connected to said anchor.

GEORGE L. SMITH.